United States Patent [19]
Kim

[11] Patent Number: 6,108,485
[45] Date of Patent: Aug. 22, 2000

[54] AUDIO DATA PLAYBACK CLOCK SIGNAL GENERATING APPARATUS FOR USE IN DIGITAL VCR

[75] Inventor: Jeong-Kyu Kim, Seoul, Rep. of Korea

[73] Assignee: Daewoo Electronics Co., Ltd., Seoul, Rep. of Korea

[21] Appl. No.: 09/069,949

[22] Filed: Apr. 30, 1998

[30] Foreign Application Priority Data

Apr. 30, 1997 [KR] Rep. of Korea ...................... 97-16838

[51] Int. Cl.[7] .................................................. H04N 5/91
[52] U.S. Cl. ............................ 386/96; 386/98; 348/423; 348/515
[58] Field of Search .................................. 386/33, 39, 96, 386/98, 101, 104–106, 46, 111–112; 348/423, 512, 515; H04N 5/91

[56] References Cited

U.S. PATENT DOCUMENTS

| | | | |
|---|---|---|---|
| 4,460,926 | 7/1984 | Nakamuta | 386/39 |
| 5,164,839 | 11/1992 | Lang | 386/104 |
| 5,208,678 | 5/1993 | Nakagawa | 386/104 |
| 5,615,056 | 3/1997 | Oguro | 386/104 |
| 5,703,877 | 12/1997 | Nuber et al. | 348/423 |
| 5,748,842 | 5/1998 | Holmes et al. | 704/270 |
| 5,930,450 | 7/1999 | Fujita | 386/95 |

FOREIGN PATENT DOCUMENTS

| | | |
|---|---|---|
| 0090582 | 10/1983 | European Pat. Off. . |
| 0241014 | 10/1987 | European Pat. Off. . |
| 0476629 | 3/1992 | European Pat. Off. . |

*Primary Examiner*—Vincent F. Boccio
*Attorney, Agent, or Firm*—Pennie & Edmonds LLP

[57] ABSTRACT

An audio data playback clock signal generating apparatus of a digital VCR synchronizes an audio frame playback synchronization signal with a video frame synchronization signal when an audio data recorded in a magnetic tape is played back based on a phase error of an audio data frame size AF-SIZE and an audio data playback clock signal of the previous video frame. The audio data playback clock signal generating apparatus comprises an audio data frame size decoder, a low pass filter, a voltage-controlled oscillator, and phase error generating block and can be implemented by a large scale integration(LSI) to thereby provide a non-complex circuit and an accurate synchronization between the audio frame playback synchronization signal and the video frame synchronization signal.

5 Claims, 6 Drawing Sheets

AUDIO DATA PLAYBACK CLOCK SIGNAL GENERATING APPARATUS FOR USE IN DIGITAL VCR

FIELD OF THE INVENTION

The present invention relates to an apparatus for a digital VCR; and, more particularly, to an audio data playback clock signal generating apparatus for use in a digital VCR.

DESCRIPTION OF THE PRIOR ART

An analog-based recording/playback technique has long been used in a conventional video cassette recorder(VCR). When images are recorded in an analog form, which is then played back by using a conventional VCR, the image quality may be deteriorated severely, especially when it is dubbed.

When a conventional VCR utilizing an analog-based recording/playback technique is in a playback mode, signals distorted due to noises and jitters are directly delivered from the VCR. Moreover, if it is edited, dubbed, or other operation is performed thereon, distortions keep being accumulated, thereby deteriorating the played back image quality. Therefore, development of a VCR utilizing a digital-based recording/playback technique has been proposed.

However, in the VCR utilizing a digital-based recording/playback technique, which is known as a digital VCR, an analog video and an analog audio signals are sampled and converted into discrete quantized digital values, and then these digital values are recorded on a magnetic tape which is used by the digital VCR as a storage medium. Since the recorded values are discrete values, if the amount of noise is sufficiently small, then it may be corrected by adding error correction values during the playback mode. In this way, in recording, the image quality deterioration due to dubbing or the like can be significantly reduced.

On the other hand, when an NTSC(the National Television System Committee) signal is digitized, the amount of data is increased, because for an analog signal, information at one point is expressed by one analog value, whereas for a digital signal, the same information is represented by a plurality of data. Therefore, the digital VCR has been mostly used only in broadcast applications.

In recent years, however, as the technique for compressing image information has evolved, the video signals can be compressed such that the amount of data is reduced by a factor of order expressed by one or two digits. Consequently, the digital VCR which provides higher image quality and suffers from less image quality deterioration on dubbing compared with a conventional analog VCR, but increases the amount of data, can be more widely utilized.

Such a digital VCR employing the compressing techniques is capable of providing higher image quality than the conventional analog VCR. However, such a digital VCR has a problem in synchronizing an audio data with a video data in a playback mode.

Referring to FIG. 1, there is shown a track pattern when a video and an audio data signals are recorded, e.g., in a 525/60 video mode, by the digital VCR according to the prior art. A tracking information recording area 150, an audio data signal recording area 130, and a video data signal recording area 110 are recorded in this order from a head assembly of each track, wherein the head assembly is mounted in the digital VCR. A gap 140 is recorded between the areas 150 and 130. Another gap 120 is recorded between the areas 110 and 130. The head assembly motion is shown by an arrow Hm while the tape motion of the magnetic tape Mt is shown by another arrow Tm. A further gap 100 is recorded after the area 110.

Generally, in a recording mode, the digital VCR records the audio data signal corresponding to the video data signal in a same frame consisted of a plurality of tracks according to a video frame synchronization signal. However, in that case, the video frame synchronization signal and an audio data sampling frequency do not coincide with each other, so that values of audio sample data per one video frame recorded on the magnetic tape is changed. For example, as shown in FIG. 2, during one period of a video frame synchronization signal $V_{sync}$, values of audio sample data generated at that period based on, e.g., an audio data sampling frequency Asf of 48 KHz, are of 1606.6 on the average, so that a timing of an audio frame playback synchronization signal and a video frame synchronization signal are different from each other.

Referring to FIG. 3, there is shown a conventional digital VCR according to the prior art as disclosed in U.S. Pat. No. 5,208,678 issued on May 4, 1993, entitled "AUDIO AND VIDEO SYNCHRONIZATION APPARATUS FOR RECORDING AND REPRODUCING SYSTEM".

With reference to FIG. 3, a video and audio data recording/playback apparatus includes a video recording processing circuit 1, an audio recording processing circuit 2, a multiplexer 3, a recording head assembly 4, a magnetic tape 5, a playback head assembly 6, a video playback processing circuit 7, an audio playback processing circuit 8, a burst lock oscillator 9, a video reference generating circuit 10, a servo circuit 11, a frequency converting circuit 12, and switches 13, 14, 15, and 16.

A reference video signal REF1 is a composite video signal which constitutes an output reference of a played back video signal, and is inputted from an external signal source via a terminal(no reference numeral). The reference video signal REF1 contains sync and burst signals and is selected by the switch 15 as a reference video signal REF2 which is fed to the video reference generating circuit 10. The video reference generating circuit 10 detects horizontal and vertical sync signals, and a color framing phase and a subcarrier phase in a burst signal from the reference video signal REF2, and outputs signals of playback reference timings to the servo circuit 11, the audio playback processing circuit 8, and the video playback processing circuit 7. The video reference generating circuit 10 also outputs a black burst signal B.B. which is remade from a timing of the reference video signal REF2 and includes sync and burst components having phases synchronous with the reference video signal REF2.

Audio data ADATA to be recorded is inputted from a digital audio interface(not shown) via a terminal (no reference numeral). Video data VDATA is inputted via another terminal (no reference numeral). The video data VDATA is fed from a video digital interface(not shown), or is obtained by the analog-to-digital conversion of a recording video signal which includes a process of sampling the recording video signal with a predetermined sampling clock signal. The audio recording processing circuit 2 receives the input audio data ADATA and then encodes the data into a predetermined format, and outputs the encoded audio data to the multiplexer 3. The encoded audio data is fed to the recording head assembly 4 via the multiplexer 3 to be recorded on the magnetic tape 5 by the recording head assembly 4. The video recording processing circuit 1 receives the input video data VDATA via the switch 13, and converts the input video data VDATA into a predetermined format similarly as in the encoding of the audio data ADATA. In addition, the video recording processing circuit 1 generates a recording servo reference timing SVIN on the basis of the input video data VDATA, and feeds the reference signal SVIN to the servo circuit 11 via the switch 16. During the normal recording process, the switch 16 allows the transmission of the reference signal SVIN from the video recording processing circuit 1 to the servo circuit 11, and the switch 13 selects the externally-fed video data VDATA as recording video data RECDATA to be fed to the video recording processing circuit 1.

During a normal playback process, the video reference generating circuit 10 feeds a playback reference timing signal SVREF to the servo circuit 11 via the switch 16, and the playback head assembly 6 plays back the recorded data from the tape 5. The played back data outputted from the playback head assembly 6 is decoded by the video playback processing circuit 7 and the audio playback processing circuit 8 into played back video data VIDEO-OUT and audio data AUDIO-OUT which are outputted to an external device (not shown).

The reference video signal REF2 transmitted via the switch 15 is also fed to the burst lock oscillator 9. The burst lock oscillator 9 generates a clock signal 4FSC1 on the basis of the burst signal in the reference video signal REF2. During the normal playback process, the output clock signal 4FSC is selected by the switch 14 as a clock signal 4FSC to be fed to the video reference generating circuit 10. Thus, the video reference generating circuit 10 remakes a signal representative of a reference video playback timing in response to the clock signal 4FSC and the reference video signal REF2, and generates the black burst signal B.B. which can be used as a video reference for an external equipment (not shown). In addition, the video reference generating circuit 10 feeds a timing start pulse signal VRST for a video output and a video processing clock signal 4FSC to the video playback processing circuit 7. Furthermore, the video reference generating circuit 10 feeds a timing start pulse signal ARST for an audio output and an audio processing clock signal ARCK to the audio playback processing circuit 8. The video timing start pulse signal VRST, the audio timing start signal ARST, the video processing clock signal 4FSC, and the audio processing clock signal ARCK are synchronous with the black burst signal B.B.

In the case where the audio data ADATA is asynchronous with the video data VDATA or the reference video signal REF1, and in the case where the video data VDATA or the reference video signal REF1 is absent, the switches 13, 14, and 15 are changed by a control signal AUDL. Specifically, the switch 14 is changed so as to feed an output clock signal 4FSC2 from the frequency converting circuit 12 to the video reference generating circuit 10 as the clock signal 4FSC. The frequency converting circuit 12 receives sync components ASYNC of the input audio data ADATA from the digital audio interface, and generates the clock signal 4FSC2 on the basis of the sync components ASYNC of the audio data ADATA. The clock signal 4FSC2 has a frequency equal to four times the color subcarrier frequency fsc.

It should be noted that the frequency 4fsc of the clock signal 4FSC2 may be controlled as follows. The video reference generating circuit 10 divides the frequency 4fsc of the input clock signal 4FSC2 with a factor corresponding to the frequency ratio in the equation 1 or 2 as follows:

$$fsc=(455/2)fh \tag{Eq.1}$$

$$fsc=(1135/4+1/625)fh \tag{Eq.2}$$

and thereby generates a first pulse signal FH with a frequency corresponding to a horizontal frequency fh of a video signal. The first pulse signal FH is outputted from the video reference generating circuit 10 to the frequency converting circuit 12. The frequency converting circuit 12 generates a second pulse signal on the basis of the sync signal ASYNC by referring to the frequency relation in a equation 3 or 4 as follows:

$$fas=(1144/375)fh \tag{Eq.3}$$

$$fas=(384/125)fh \tag{Eq.4}$$

and the second pulse signal has a frequency equal to the horizontal frequency fh. The frequency converting circuit 12 compares the frequency of the first pulse signal and the frequency of the second pulse signal, and controls the frequency of the output clock signal 4FSC2 in response to the result of the frequency comparison so that the frequency of the first pulse signal will be locked to the frequency of the second pulse signal.

In the case when the audio data ADATA is asynchronous with the video data VDATA or the reference video signal REF1, and in the case when the video data VDATA or the reference video signal REF1 is absent, the switch 13 is changed together with the switch 14. Specifically, the switch 13 is changed so as to feed timing data B.B.DATA from the video reference generating circuit 10 to the video recording processing circuit 1 instead of the recording video data VDATA. The timing data B.B.DATA is a base for the black burst signal B.B. In the presence of a function of converting an analog video signal into a digital video signal and recording the digital video signal, the switch 13 may be changed so that the black burst signal B.B. will be fed instead of the analog video signal. The switch 15 is changed together with the switch 13. Specifically, the switch 15 is opened so that feeding the reference video signal REF2 to the video reference generating circuit 10 will be interrupted. In this case, the operation of the video reference generating circuit 10 moves into an internal mode or a self-running mode where a continuous video reference timing signal is internally and automatically generated.

According to the prior art as described above, in a normal playback mode, a phase error between the audio data and the video data may be significantly reduced. However, if it is edited, dubbed, or other operation is performed thereon, the phase error may be accumulated so that a played back video image is deteriorated severely.

SUMMARY OF THE INVENTION

It is, therefore, an object of the present invention to provide an audio data playback clock signal generating apparatus for use in a digital VCR.

In accordance with the present invention, there is provided, for use in a digital VCR, an apparatus for generating an audio data playback clock signal by comparing a present audio data frame playback synchronization signal corresponding to a present audio data frame size AF-SIZE with a present video frame synchronization signal, calculating a phase error between the present audio frame playback synchronization signal and the present video frame synchronization signal, and adding the phase error to a next audio data frame value AFV, wherein the audio data frame values AFV are obtained by applying a predetermined manipulation on audio data frame sizes AF-SIZE's and the phase error is generated by a phase error generation means, the apparatus comprising; a decoder for decoding the audio data frame size AF-SIZE representing a number of audio sample data on a frame basis and outputting the audio data frame value AFV by applying a predetermined relative equation to the audio data frame size AF-SIZE; an adder for adding the audio data frame value AFV with the phase error; a pulse width modulator for modulating a sampling clock signal and producing a reference PWM signal PR and a variable duty ratio PWM signal PWMO, wherein the reference PWM signal PR is obtained by dividing the sampling clock which is applied by an external oscillator with a predetermined value and the variable duty ratio PWM signal PWMO is obtained by determining its duty ratio according to the reference PWM signal PR; a filter for filtering the variable duty ratio PWM signal PWMO and outputting a direct current Vc corresponding to the filtered variable duty ratio PWM signal PWMO; a voltage-controlled oscillator for generating the audio frame playback clock signal according to the direct current Vc outputted from the filter means; and a phase error generation block for generating an audio frame playback synchronization signal based on the audio data playback clock signal and the audio data frame size AF-SIZE, comparing the audio frame playback synchronization signal with the video frame synchronization signal, and creating the phase error between the audio frame playback synchronization signal and the video frame synchronization signal based on the reference PWM signal from the pulse width modulation means.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 4:
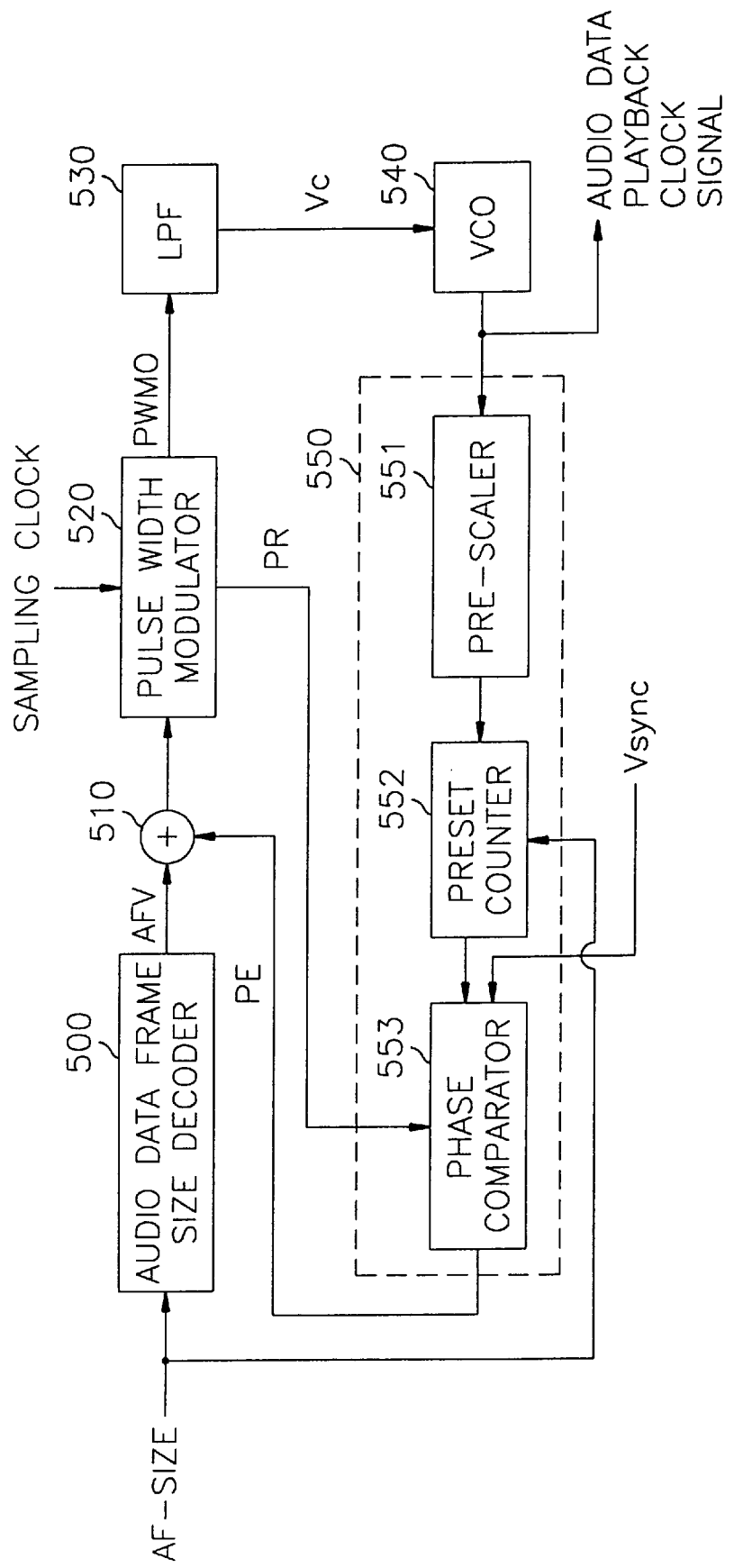
FIG. 4 depicts a block diagram of an audio data playback clock signal generating apparatus in accordance with the present invention.

Now referring to FIG. 4, there is shown an audio data playback clock signal generation apparatus for using in a digital video cassette recorder(VCR) in accordance with a preferred embodiment of the present invention, wherein the digital VCR can perform recording/playback operations. As shown in FIG. 4, the audio data playback clock signal generation apparatus comprises an audio data frame size decoder 500, an adder 510, a pulse width modulator 520, a low pass filter(LPF) 530, a voltage-controlled oscillator (VCO) 540, and a phase error generation block 550, wherein the phase error generation block 550 includes a pre-scaler 551, a preset counter 552, and a phase comparator 553.

TABLE 1

| video mode | audio data sampling frequency | AF-SIZE samples/frame | | |
|---|---|---|---|---|
| | | Maximum | Minimum | Average |
| 525/60 | 48 KHz | 1620 | 1580 | 1601.6 |
| | 44.1 KHz | 1489 | 1452 | 1471.47 |
| | 32 KHz | 1080 | 1053 | 1067.73 |

Figure 1:
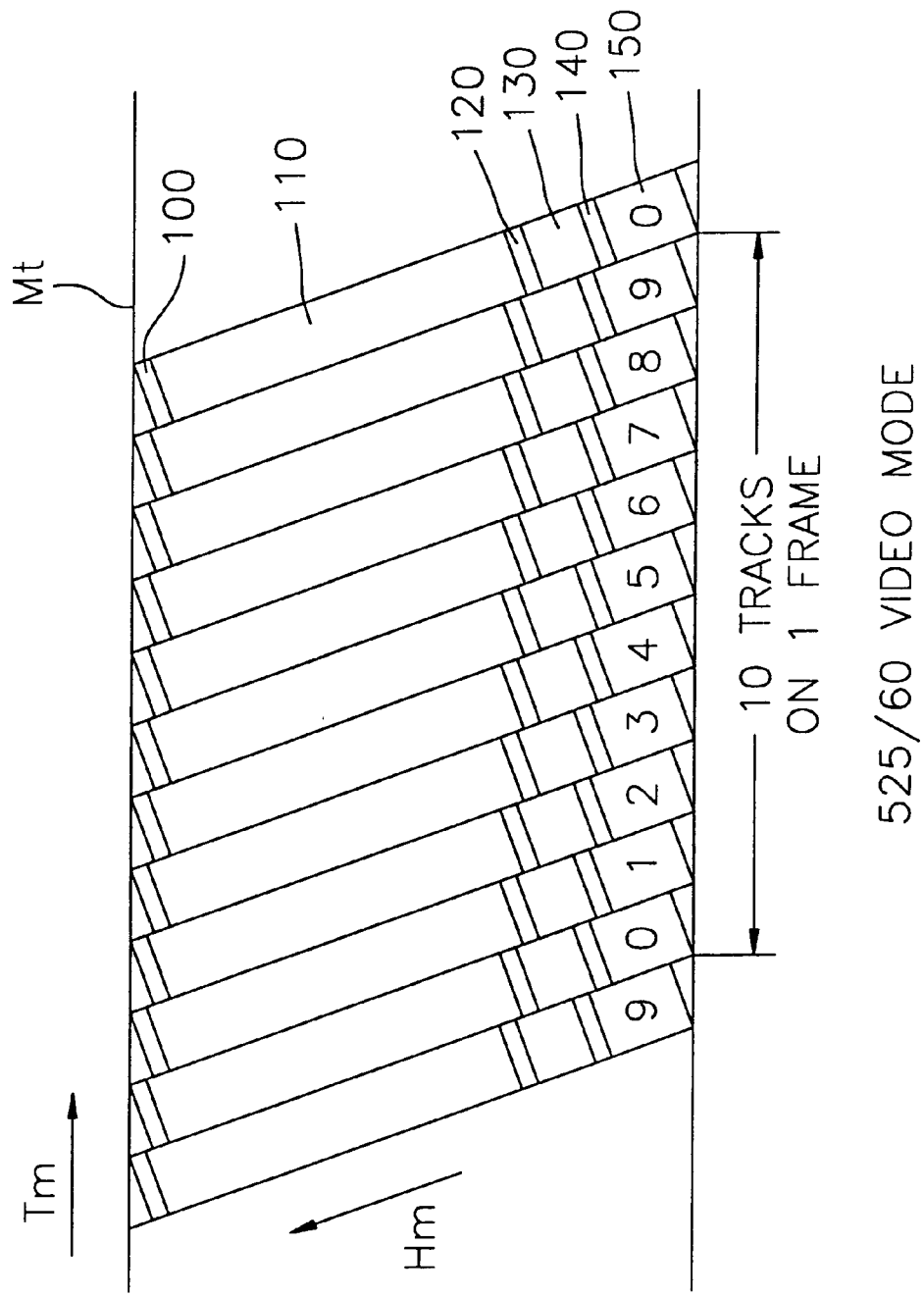
FIG. 1 shows a diagram of a track pattern of a video and an audio frames created by conventional digital VCR units.
Figure 2:
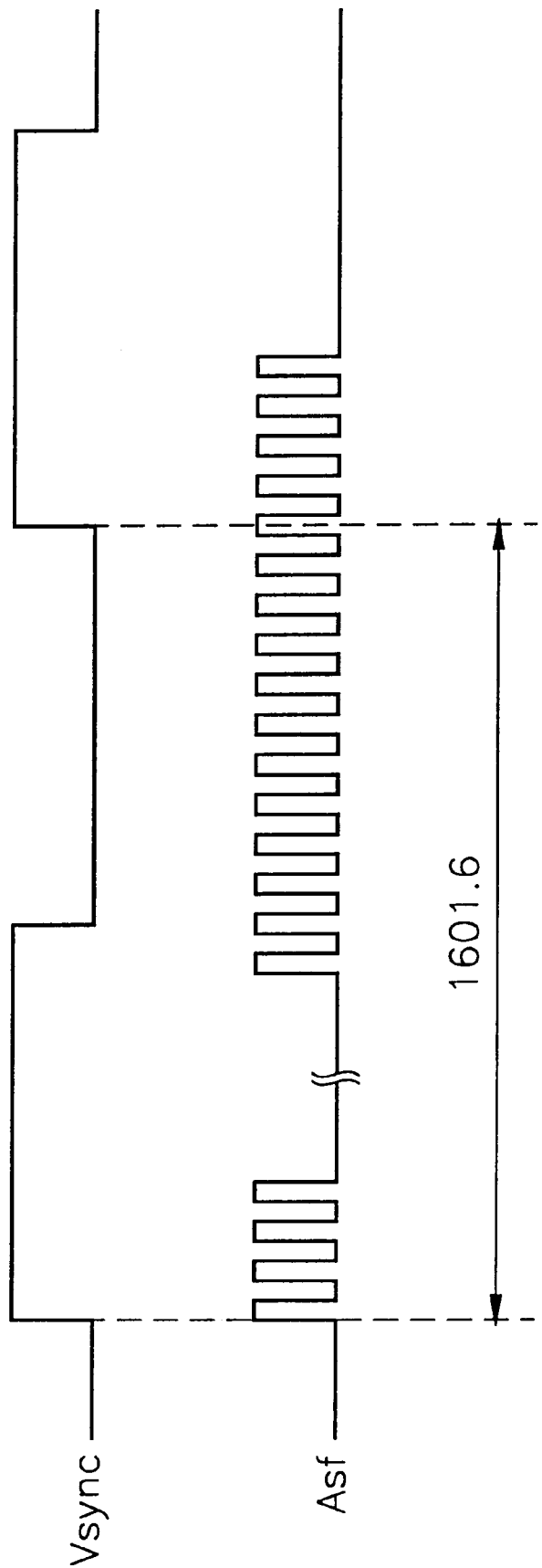
FIG. 2 illustrates signal waveforms of a conventional video frame synchronization signal and an audio sampling clock signal.
Figure 3:
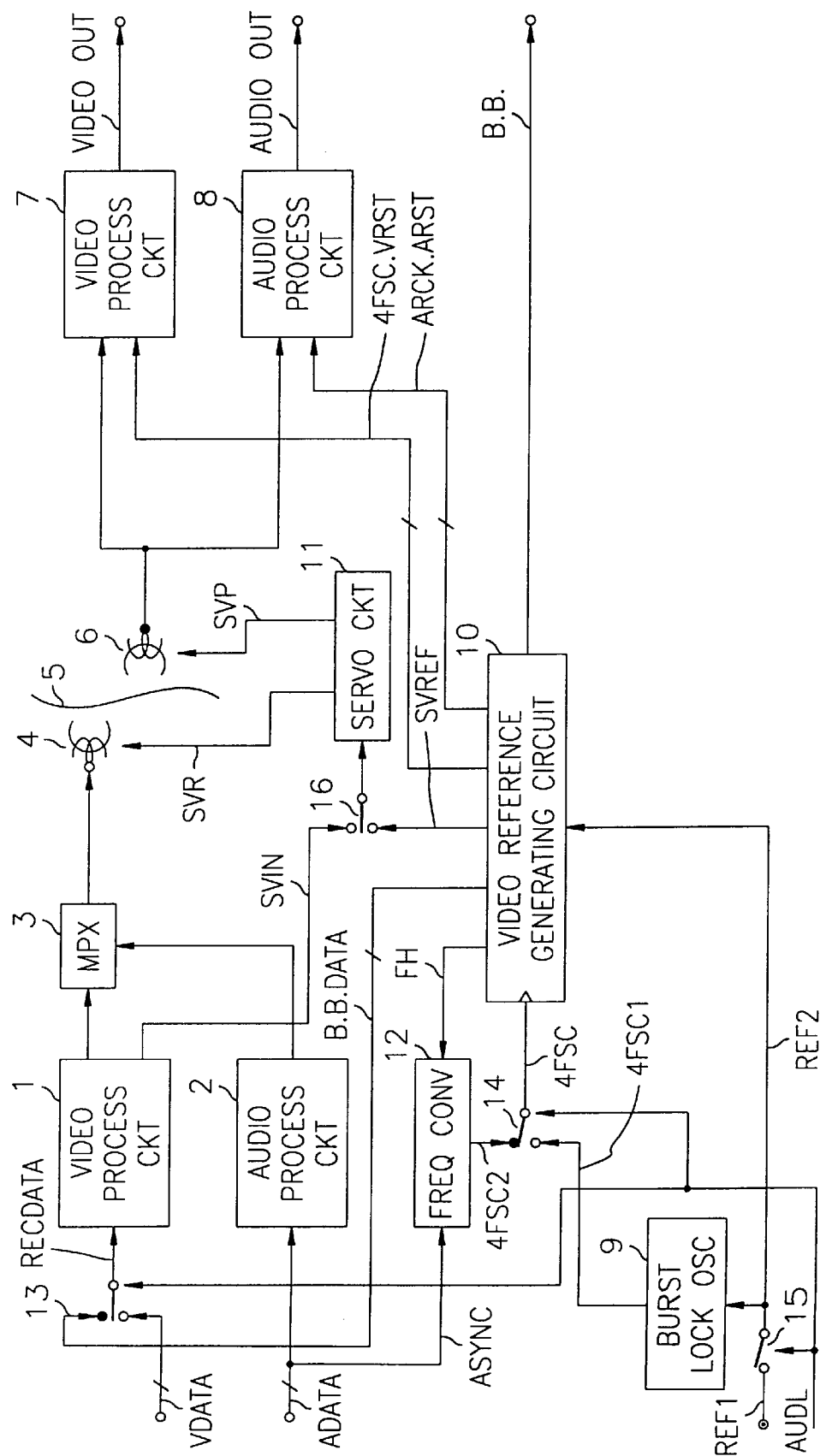
FIG. 3 presents a conventional digital VCR in accordance with the prior art.

As can be seen from table 1, the maximum and minimum values of an audio data frame size AF-SIZE are determined by the video mode and the audio data sampling frequency when the digital VCR performs a recording operation. For example, in a 525/60 video mode, the audio data frame size AF-SIZE has a single integer value from the minimum value 1580 to the maximum value 1620 while audio data is sampled by an audio data sampling frequency of 48 kHz. Also, in the 525/60 video mode, the audio data frame size AF-SIZE has a single integer value from the minimum value 1452 to the maximum value 1489 while the audio data is sampled by the frequency of 44.1 kHz, and from the minimum value 1053 to the maximum value 1080 while the audio data is sampled by the frequency of 32 kHz, wherein the audio data frame size AF-SIZE is recorded on an audio data signal recording area 130 in a magnetic tape shown in FIG. 1.

The audio data frame size decoder 500 receives an audio data frame size AF-SIZE from a playback head assembly (not shown) thereto, decodes the received audio data frame size AF-SIZE, and produces an audio data frame value AFV.

In the audio data frame size decoder 500, the audio data frame value AFV is obtained by subtracting a minimum audio data frame size $AF\text{-}SIZE_{min}$ from a received audio data frame size $AF\text{-}SIZE_{received}$, by multiplying the subtracted AF-SIZE value by 2, and by adding a specific value X to the subtracted AF-SIZE value as described in equation 1, $$AFV=[\{AF\text{-}SIZE_{received}-(AF\text{-}SIZE_{min})\}\times 2]+X \quad (Eq.1)$$

wherein the specific value X depends on the audio data sampling frequency.

Figure 5:
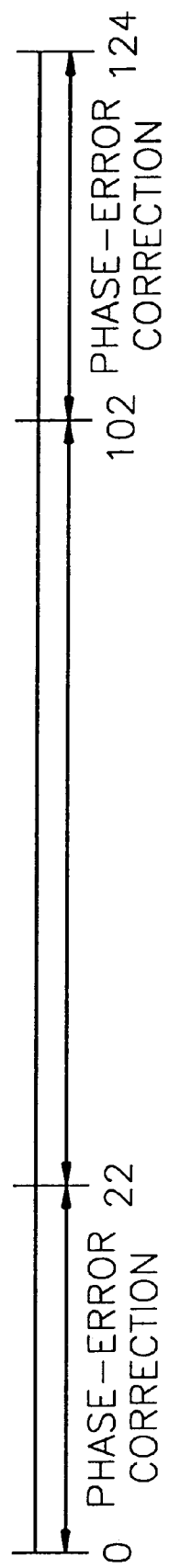
FIG. 5 shows a diagram for explaining an operation of an audio data frame size AF-SIZE decoder.

For example, in the 525/60 video mode, if the audio data sampling frequency is 48 KHz and the audio data frame size AF-SIZE is 1620, the subtracted AF-SIZE value has 40 levels and results in an audio data frame value AFV having 22, 24, 26, . . . , 98, 100, 102. As shown in FIG. 5, the resultant audio data frame value AFV fed from the audio data frame size decoder 500 has value ranging from 22 to 102, wherein the values ranging from 0 to 21 and from 103 to 124 are used for correcting a phase error between the audio data and the video data, which will be described later in more detail. In the 525/60 video mode, when the audio data sampling frequency is to 44.1 kHz or 32 kHz, the operation of the audio data frame size decoder 500 is same as described above.

Thereafter, the audio data frame size decoder 500 transmits the audio data frame value AFV to the adder 510. The adder 510 adds the audio data frame value AFV to a phase error signal PE fed thereto from the phase comparator 553.

The pulse width modulator 520 modulates a sampling clock generated by an external oscillator(not shown), e.g., 18 MHz fed thereto with reference to an error corrected signal inputted from the adder 510, to thereby produce a variable duty PWM signal PWMO and a reference PWM signal PR, wherein the variable duty PWM signal PWMO is 144 KHz of a variable duty ratio having 125 levels and the reference PWM signal PR is of 144 KHz having 50% duty ratio. The variable duty PWM signal PWMO is inputted to the low pass filter(LPF) 530 and the reference PWM signal PR is transmitted to the phase comparator 553.

The low pass filter 530 filters the variable duty PWM signal PWMO inputted thereto from the pulse width modulator 520, to thereby produce a direct voltage Vc; and transmits the direct voltage Vc produced therein to the a voltage-controlled oscillator 540.

The voltage-controlled oscillator 540 produces an audio data playback clock signal which depends on the direct voltage Vc level fed thereto from the low pass filter(LPF) 530; and provides the phase error generation block 550 with the audio data playback clock signal generated therein.

The pre-scaler 551 receives the audio data playback clock signal fed thereto from the voltage-controlled oscillator 540; and scales the audio data playback clock signal therein with the audio data frame size AF-SIZE. The preset counter 552 compares the audio data frame size AF-SIZE inputted thereto with the scaled audio data playback clock signal from the prescaler 551; and counts a pulse of the scaled audio data playback clock signal, scaled with the audio data frame size AF-SIZE inputted therein, to thereby produce an audio frame playback synchronization signal.

Thereafter, the phase comparator 553 compares a video frame synchronization signal $V_{sync}$ inputted thereto with the audio frame playback synchronization signal fed from the preset counter 552; calculates a timing interval between the video frame synchronization signal $V_{sync}$ and the audio frame playback synchronization signal; produces a phase error signal PE based on the timing interval; and transmits the phase error signal PE to the adder 510. The phase error signal PE is added to a next audio data frame size AF-SIZE$_{next}$ through the adder 510.

Figure 6A:
FIG. 6 represents signal waveforms for explaining a phase comparator.
Figure 6B:
Figure 6C:
Figure 6D:
Figure 6E:

Referring to FIG. 6A, there is shown the video frame synchronization signal $V_{sync}$. The video frame synchronization signal $V_{sync}$ is a reference signal of the playback mode and transmitted to the phase comparator 553. An audio frame playback synchronization signal fed from the preset counter 552 shown in FIG. 6B is inputted to the phase comparator 553 to be compared with the video frame synchronization signal $V_{sync}$. When the phase error A between the video frame synchronization signal $V_{sync}$ and the audio frame playback synchronization signal is detected at the phase comparator 553 as shown in FIG. 6B, a signal is outputted to the adder 510 for performing an up/down operation on the phase error shown in FIGS. 6C to 6D.

For example, when the video frame synchronization signal $V_{sync}$ is generated before the audio frame playback synchronization signal as shown in FIG. 6B, a phase error up signal corresponding to the phase error A, i.e., a pulse signal is generated at the phase comparator 553. The phase error up signal is outputted as the phase error signal PE by counting of the preset counter 552 with reference to the reference PWM signal PR fed from the pulse width modulator 520.

Therefore, the timing interval, resulting in the phase error, between the video frame synchronization signal $V_{sync}$ and the audio frame playback synchronization signal would be reduced and in turn the phase error cannot be accumulated when the signal is edited or dubbed, or the like operation is performed thereon by the digital VCR.

While the present invention has been shown and described with reference to those skilled in the art that many changes and modifications may be without departing from the spirit and scope of the invention as defined in the appended claims.

What is claimed is:

1. An apparatus for generating an audio data playback clock signal by comparing a present audio data frame playback synchronization signal corresponding to a present audio data frame size AF-SIZE with a present video frame synchronization signal, calculating a phase error between the present audio frame playback synchronization signal and the present video frame synchronization signal, and adding the phase error to a next audio data frame value AFV, wherein the audio data frame values AFV are obtained by applying a predetermined manipulation on audio data frame sizes AF-SIZE's and the phase error is generated by a phase error generation means, the apparatus comprising;

means for decoding the audio data frame size AF-SIZE representing a number of audio sample data on a frame basis and outputting the audio data frame value AFV by applying a predetermined relative equation to the audio data frame size AF-SIZE;

means for adding the audio data frame value AFV with the phase error;

a pulse width modulation means for modulating a sampling clock signal and producing a reference PWM signal PR and a variable duty ratio PWM signal PWMO, wherein the reference PWM signal PR is obtained by dividing the sampling clock which is applied by an external oscillator with a predetermined value and the variable duty ratio PWM signal PWMO is obtained by determining its duty ratio according to the reference PWM signal PR;

a filter means for filtering the variable duty ratio PWM signal PWMO and outputting a direct current Vc corresponding to the filtered variable duty ratio PWM signal PWMO;

a voltage-controlled oscillation means for generating the audio frame playback clock signal according to the direct current Vc outputted from the filter means; and a phase error generation means for generating an audio frame playback synchronization signal based on the audio data playback clock signal and the audio data frame size AF-SIZE, comparing the audio frame playback synchronization signal with the video frame synchronization signal, and creating the phase error between the audio frame playback synchronization signal and the video frame synchronization signal based on the reference PWM signal from the pulse width modulation means.

2. The apparatus according to claim 1, wherein the audio data frame value AFV is a linearly mapped value on the audio data frame size AF-SIZE by subdividing the sampling clock signal fed from the external oscillator into 125 levels and scaling up/down the divided sampling clock signal with the difference of a maximum audio data frame size and a minimum audio data frame size.

3. The apparatus according to claim 2, wherein the audio data frame value AFV outputted from the audio data frame size decoder is produced by subtracting the minimum audio data frame size AF-SIZE$_{min}$ from the audio data frame size AF-SIZE inputted to the audio data frame size decoder, multiplying 2 and adding the specific value X to the subtracted audio data frame size.

4. The apparatus according to claim 3, wherein the reference PWM signal has a duty ratio of 50% obtained by dividing the sampling clock into 125 levels.

5. The apparatus according to claim 4, wherein the phase error generating block includes:

a scaling means for generating a frequency which is near to the audio data sampling frequency by dividing the audio data playback clock signal outputted from the voltage-controlled oscillator with a predetermined value; and a counting means for outputting an audio data playback synchronization signal by dividing the audio data sampling frequency outputted from the scaling means in accordance with the audio data frame size AF-SIZE inputted thereto.

\* \* \* \* \*